United States Patent [19]
Lieber et al.

[11] Patent Number: 6,159,742
[45] Date of Patent: Dec. 12, 2000

[54] NANOMETER-SCALE MICROSCOPY PROBES

[75] Inventors: Charles M. Lieber, Lexington; Stanislaus S. Wong, Cambridge; Adam T. Woolley, Belmont; Ernesto Joselevich, Cambridge, all of Mass.

[73] Assignee: President and Fellows of Harvard College, Cambridge, Mass.

[21] Appl. No.: 09/326,100

[22] Filed: Jun. 4, 1999

Related U.S. Application Data

[60] Provisional application No. 60/122,051, Jun. 5, 1998.

[51] Int. Cl.$^7$ .......................... G01N 21/00; G01N 33/544
[52] U.S. Cl. .......................... 436/164; 436/171; 436/524; 436/526; 436/528; 436/535; 422/55; 422/57
[58] Field of Search ................................... 436/171, 164, 436/524, 526, 535; 422/55, 57

[56] References Cited

U.S. PATENT DOCUMENTS 5,824,470 10/1998 Baldeschwieler et al. ................. 435/6
5,866,434 2/1999 Massey et al. ........................... 436/526

FOREIGN PATENT DOCUMENTS

WO 98/05920 2/1998 WIPO.

OTHER PUBLICATIONS

Binnig et al., "Atomic Force Microscope", *Physical Review Letters*, 56:930–933, 1986.

Bustamante et al., "Scanning force microscopy under aqueous solutions", *Biophysical methods*, 709–716.

Dai et al., "Nanotubes as nanoprobes in scanning probe microscopy", *Letters to Nature*, 384:147–150, 1996.

Evans et al., "Electrocatalysis of Solution Species Using Modified Electrodes", *J. Electroanal. Chem.*, 80:409–416, 1997.

Fagan et al., "Some Well Characterized Chemical Reactivities of Buckministerfullerene ($C_{60}$)", 30:1213–1226, 1992.

Florin et al., "Adhesion Forces Between Individual Ligand–Receptor Pairs", *Science*, 264:415–417, 1994.

Frisbie et al., "Functional Group Imaging by Chemical Force Microscopy", *Science*, 265:2071–2074, 1994.

Gilles et al., "Stability of Water–Soluble Carbodiimides in Aqueous Solution", *Analytical Biochemistry*, 184:244–248, 1990.

Hansma et al., "Tapping mode atomic force microscopy in liquids", *Appl. Phys. Lett.*, 64:1738–1740, 1994.

Hiura et al., "Opening and Purification of Carbon Nanotubes in High Yields", *Advanced Materials*, 7:275–276, 1995.

Keller, "A nanotube molecular tool", *Nature*, 384:111, 1996.

Kumar et al., "Patterning Self–Assembled Monolayers: Applications in Materials Science", *Langmuir*, 10:1498–1511, 1994.

Lee et al., "Sensing Discrete Streptavidin–Biotin Interactions with Atomic Force Microscopy", *Langmuir*, 10:354–357, 1994.

Livnah et al., "Three–dimensional structures of avidin and the avidin–biotin complex", *Proc. Natl. Acad. Sci. USA*, 90:5076–5080, 1993.

McKendry et al., "Chiral discrimination by chemical force microscopy", *Nature*, 391:566–568, 1998.

Noy et al., "Chemically–Sensitive Imaging in Tapping Mode by Chemical Force Microscopy: Relationship between Phase Lag and Adhesion", *Langmuir*, Jan., 1998.

Noy et al., "Chemical Force Microscopy", *Annu. Rev. Mater. Sci.*, 27:381–421, 1997.

Prato, "Fullerene chemistry for materials science applications", *J. Mater. Chem.*, 7:1097–1109, 1997.

Thess et al., "Crystalline Ropes of Metallic Nanotubes", *Science*, 273:483–487, 1996.

Vezenov et al., "Froce Titrations and Ionization State Sensitive Imaging of Functional Groups in Aqueous Solutions by Chemical Force Microscopy", *J. Am. Chem. Soc.*, 119:2006–2015, 1997.

Wandass et al., "X–Ray Photoelectron and Scanning Auger Electron Spectroscopic Studies of Oxidized Graphite Electrode Surfaces", *J. Electrochem. Soc.*, 134:2734–2739, Nov., 1987.

Wong et al., "Nanobeam Mechanics: Elasticity, Strength, and Toughness of Nanorods and Nanotubes", *Science*, 277:1971–1975, Sep., 1997.

Wong et al., "Carbon Nanotube Tips: High–Resolution Probes for Imaging Biological Systems", *J. Am. Chem. Soc.*, 120:603–604, 1998.

Wudl, "The Chemical Properties of Buckministerfullerene ($C_{60}$) and the Birth and Infancy of Fulleroids", *Acc. Chem. Res.*, 25:157–161, 1992.

Yu et al., "Platinum Deposition of Carbon Nanotubes via Chemical Modification", *Chem. Mater.*, 10:718–722, 1998.

*Primary Examiner*—Jill Warden
*Assistant Examiner*—Dwayne K Handy
*Attorney, Agent, or Firm*—Fish & Richardson P.C.

[57] ABSTRACT

A carbon-based tip for scanning probe microscopy. The tip used in microscopy to reveal chemical characteristics of a sample includes a structure of the formula:

$$X-(L-M)_n$$

in which n is 1 to 100, X is a carbon-based nanotube, L is a linking group bonded at an end of the carbon-based nanotube, and M is a molecular probe bonded to the linking group.

24 Claims, 3 Drawing Sheets

NANOMETER-SCALE MICROSCOPY PROBES

CROSS REFERENCE

This application claims priority from U.S. Ser. No. 60/122,051 filed Jun. 5, 1998 under 35 USC 119(e)(1).

STATEMENT AS TO FEDERALLY SPONSORED RESEARCH

This invention was made with support from the Department of the Air Force, grant no. F49620-97-1-0005, and the National Institute of Health, grant no. AG14366-01. Accordingly, the U.S. government may have certain rights in the invention.

BACKGROUND OF THE INVENTION

The invention relates to carbon-based nanometer scale probes for microscopy.

Scanning probe microscopies, such as atomic force microscopy, are used to image, with high sensitivity and precision, the microscopic topography and surface properties of a sample. Other types of microscopic techniques include optical, transmission electron, scanning electron, interfacial force, colloid probe, optical tweezers, and surface force.

A typical force microscope, such as that employed for atomic force microscopy, includes a cantilever-tip to image a sample, a detector to measure the displacement of the cantilever-tip, and feedback electronics to maintain a constant imaging parameter, such as a tip-sample separation or force. Atomic force microscopy experiments can be conducted in a range of environments, e.g., in air, in vacuum, in liquids, and at different temperatures. Atomic force microscopy can be used to resolve forces, for example, on the order of piconewtons.

SUMMARY OF THE INVENTION

Modifications of carbon-based nanotube tips enable the facile creation of chemically well-defined probes which are sensitive to specific intermolecular interactions. Measurement of these interactions can be used to observe the properties of chemical and biological systems. These probes can be used in microscopy to measure the adhesion and frictional forces of a sample, thereby enabling one to sense a variety of functionalities associated with chemical and biological processes.

In one aspect, the invention features a carbon-based tip for scanning probe microscopy. The tip used to reveal chemical characteristics of a sample includes a structure of the formula:

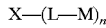

in which n is 1 to 100, X is a carbon-based nanotube, L is a linking group bonded at an end of the carbon-based nanotube, and M is a molecular probe bonded to the linking group.

The linking group (L) can include a functional moiety selected from the group consisting of amino, amido, carbonyl, carboxyl, alkyl, aryl, ether, and ester.

The molecular probe (M) can be selected from the group consisting of hydrogen, hydroxy, amino, $C_{1-20}$ alkyl, $C_{2-20}$ alkenyl, $C_{2-20}$ alkynyl, $C_{1-20}$ heteroalkyl, $C_{2-20}$ heteroalkenyl, $C_{3-8}$ cycloalkyl, $C_{3-8}$ cycloalkenyl, $C_{4-8}$ aryl, $C_{2-30}$ heterocycle, a polypeptide, a polysaccharide, a lipid, and a polynucleotide.

In another aspect, the invention features a method of probing a sample by scanning probe microscopy by providing a carbon-based nanotube having a molecular probe linked to one end of the carbon-based nanotube, and sensing the surface of the sample with the molecular probe to reveal the chemical characteristics of the sample. The molecular probe can be linked through an amino, amido, carbonyl, carboxyl, alkyl, aryl, ether, or ester to the end of the carbon-based nanotube. Examples of the molecular probe include hydrogen, hydroxy, amino, $C_{1-20}$ alkyl, $C_{1-20}$ alkenyl, $C_{2-20}$ alkynyl, $C_{2-20}$ heteroalkyl, $C_{2-20}$ heteroalkenyl, $C_{3-8}$ cycloalkyl, $C_{3-8}$ cycloalkenyl, $C_{4-8}$ aryl, $C_{2-30}$ heterocycle, a polysaccharide, a lipid, a polypeptide, and a polynucleotide.

In another aspect, the invention features a method of removing a molecular probe from a carbon-based tip for use in scanning probe microscopy by providing a carbon-based tip which includes a carbon-based nanotube and a first molecular probe linked to one end of the carbon-based nanotube; by providing a metal surface near the first molecular probe; and by applying a voltage between the carbon-based nanotube and the metal surface to remove the molecular probe. The voltage can be between 1 volt and 50 volts.

As used herein, the term "nanotube" means a hollow article having a narrow dimension (diameter) of about 1–200 nm and a long dimension (length), where the ratio of the long dimension to the narrow dimension, i.e., the aspect ratio, is at least 5. In general, the aspect ratio is between 10 and 2000. Carbon-based nanotubes are hollow structures composed, at least partially, of carbon atoms. The carbon nanotube can be doped with other elements, e.g., metals, B, and N. Typically, the carbon-based nanotubes are composed between about 95 to 100% of carbon. The carbon-based nanotube can be either multi-walled nanotubes (MWNTs) or single-walled nanotubes (SWNTs). A MWNT, for example, includes several nanotubes each having a different diameter. Thus, the smallest diameter tube is encapsulated by a larger diameter tube, which in turn, is encapsulated by another larger diameter nanotube. A SWNT, on the other hand, includes only one nanotube. MWNTs, typically, are produced either as single MWNTs or as bundles of MWNTs. SWNTs, on the other hand, are produced, typically, as ropes of SWNTs where each strand of the rope is a SWNT.

The term "heterocycle" refers to, for example, a cyclic substituent having 1 to 4 heteroatoms, e.g., O, N, or S. For example, the term "$C_{2-30}$ heterocycle" refers to a cyclic substituent having 2–30 carbons and at least one heteroatom. Together, the carbon atoms and heteroatom(s) can form a single ring, a fused ring, or a bridged ring substituent. The "heterocycle" also can be aromatic. Examples of heterocycles include, but are not limited to pyridyl, furyl, pyrrolyl, thiophenyl, 1,4-benzodioxanyl, quinazolinyl. The term "$C_{1-20}$ alkyl" refers to a linear or branched alkyl group containing 1–20 carbon atoms, including but not limited to methyl, ethyl, n-propyl, i-propyl, n-butyl, t-butyl, amyl, or amylmethyl. The term "$C_{1-20}$ heteroalkyl" refers to a linear or branched alkyl group having 1 to 4 of O, N, or S atoms. The term "$C_{2-20}$ alkenyl" or "$C_{2-20}$ alkynyl" refers to a linear or branched group containing 2–20 carbon atoms having at least two carbon atoms unsaturated to form a double bond or a triple bond. The double bond can be located anywhere along the $C_{2-20}$ chain. The term "$C_{2-20}$ heteroalkenyl" refers to a alkenyl group having 2 to 4 of O, N, S atoms.

$C_{1-20}$ alkyl, $C_{2-20}$ alkenyl, $C_{2-20}$ alkynyl, $C_{1-20}$ heteroalkyl, and $C_{2-20}$ heteroalkenyl, $C_{3-8}$ cycloalkyl, $C_{3-8}$ cycloalkenyl, $C_{4-8}$ aryl, and $C_{2-30}$ heterocycle can be substituted with one or more substituent groups. Substituent groups, include, but are not limited to, halogen, $C_{1-3}$ alkyl, hydroxy, sulfhydryl, and aryl.

Modified carbon-based nanotubes of this invention can be used in scanning probe microscopies, such as atomic force microscopy. The high aspect ratio of such nanotubes provides significant advantages for probing deep crevices of, for example, microelectronic circuits. The unique ability of a carbon nanotube to flex and to buckle elastically makes these nanotubes very robust while limiting the maximum force applied to delicate organic and biological samples. In addition, carbon-based nanotubes used to probe samples show significantly improved lateral resolution (<4 nm) due to the smaller effective radii of nanotube tips compared with commercial silicon probes. In addition, the tip end of each carbon-based nanotube is chemically well-defined to include a specific molecular probe.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following drawings and detailed description, and from the claims.

DESCRIPTION OF THE PREFERRED EMBODIMENT

The ends of carbon-based nanotubes can be chemically modified to incorporate, for example, acidic, basic, hydrophobic, hydrophilic or biologically active functionality. The modified carbon-based nanotubes can then be used as microscopy probes, e.g., to titrate the acid and base groups, to image patterned samples with chemical sensitivity, or to measure the binding force between single protein-ligand pairs.

A carbon-based tip for scanning probe microscopy used to reveal chemical characteristics of a sample has the formula:

$$X(L-M)_n$$

in which n is 1 to 100 (preferably, 20 or smaller), X is a carbon-based nanotube, L is a linking group chemically bonded at an end of the carbon nanotube, and M is a molecular probe bonded to the linking group. The value of n is, typically, dependent upon the diameter of the nanotube. For example, a larger diameter carbon-based nanotube can have a larger value of n than a smaller diameter carbon-based nanotube. X can be a SWNT or a MWNT. Examples of L include, but are not limited to, amino, amido, carbonyl, carboxyl, alkyl, aryl, ether, and ester. L can be any species linking a molecular probe to the carbon-based nanotube. M can be any suitable chemical moiety. For example, M can be any moiety having 1–30 carbon atoms, 1–20 carbon atoms, 1–16 carbon atoms, 1–12 carbon atoms, or 1–6 carbon atoms. Examples of M include, but are not limited to, hydrogen, hydroxy, amino, $C_{1-20}$ alkyl, $C_{2-20}$ alkenyl, $C_{2-20}$ alkynyl, $C_{1-20}$ heteroalkyl, $C_{2-20}$ heteroalkenyl, $C_{3-8}$ cycloalkyl, $C_{3-8}$ cycloalkenyl, $C_{4-8}$ aryl, $C_{2-30}$ heterocycle, a polypeptide, a polysaccharide, a lipid, and a polynucleotide.

Figure 1:
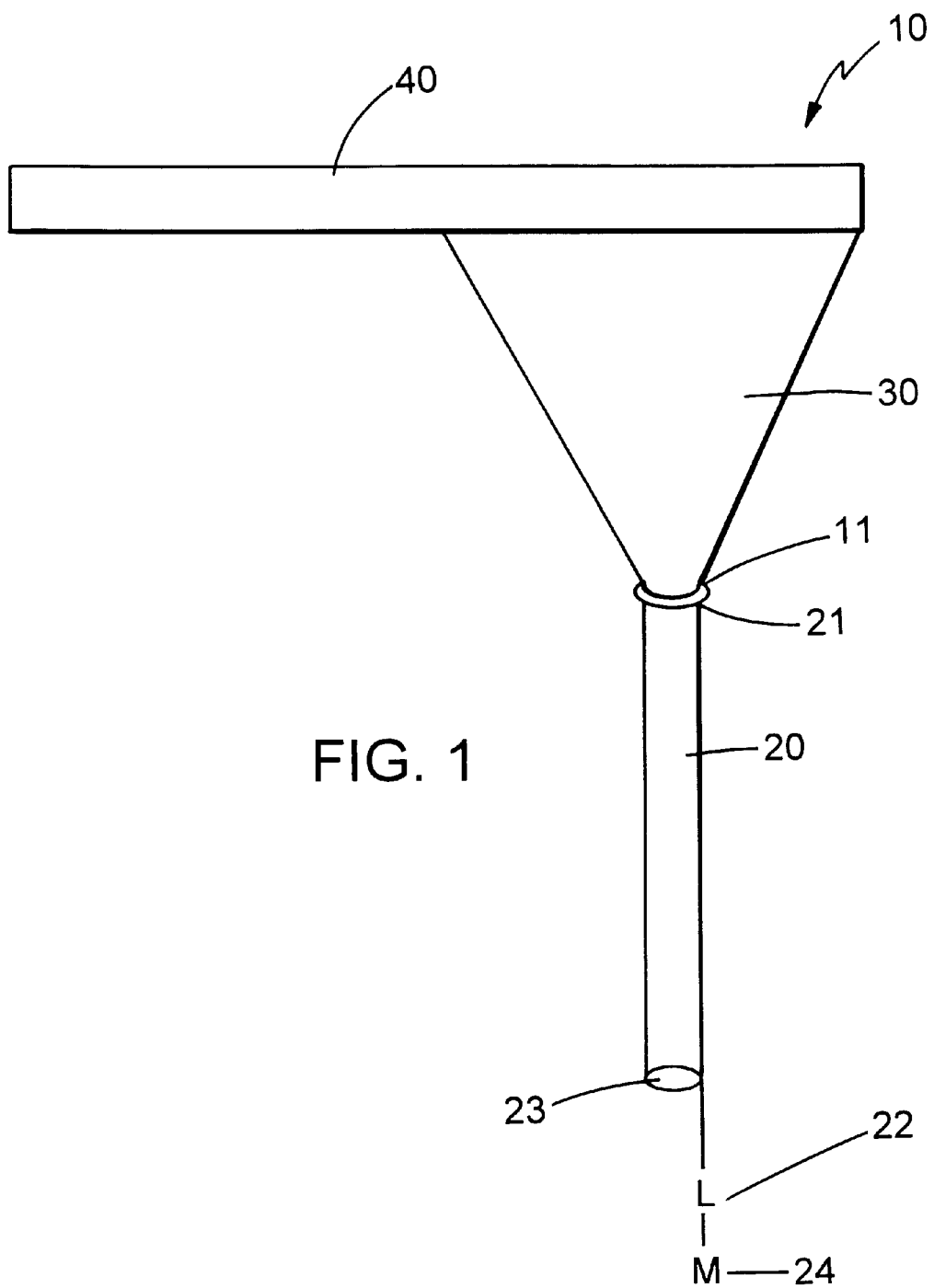
FIG. 1 shows a schematic illustration of a microscopy probe assembly.

Referring to FIG. 1, a microscopy probe assembly 10 includes a carbon-based nanotube 20 with one end 21 attached, for example, by an adhesive 11, to a pyramidal section 30 of cantilever 40. Typically, pyramidal section 30 is made from Au-coated Si and cantilever 40 is made from silicon or silicon nitride. At least one linking group (L) 22 is connected to the other end 23 of carbon-based nanotube 20. The linking group is also connected to a molecular probe (M) 24. The connection from the linking group to either carbon-based nanotube 20 or molecular probe 24 can be either covalent, ionic, or dative. A dative bond can include, for example, a ligand bound to a metal atom.

Molecular probe (M) 24 and linking group (L) 22, typically, are attached to carbon-based nanotube 20 using conventional chemical techniques. For example, carbon-based nanotube 20 can be oxidized to produce a terminal carboxylic acid (—COOH) moiety. In turn, the —COOH moiety can be used link or bond another chemical moiety to the carbon-based nanotube. For example, the —COOH moiety can be converted in to an amide (—(CO)NHM) moiety, thereby linking a molecular probe (M) to the nanotube. Additional examples of —COOH conversions include, but are not limited to, amines, esters, isocyanates, acyl halides, aldehydes, anhydrides, alcohols, ketones, and peroxides. See March, J. *Advanced Organic Chemistry* (John Wiley and Sons, Inc., 1992) and Bodanszky, M. & Bodanszky, A. *The Practice of Peptide Synthesis*, 2nd ed. (Springer-Verlag, New York, 1994).

Carbon-based nanotube 20, generally, has a high aspect ratio of about 10 to 2000 and a diameter of about 1 to 200 nm. In some instances, the carbon based nanotube can be doped with other elements, e.g., metals, B, and N. The carbon-based nanotube exhibits elastic buckling. For instance, it can sustain large deflection loads at large deflection angles without permanent deformation. See, e.g., Wong et al, *Science* 277, 1971–1975 (1997).

Microscopy probe assembly 10 can be used in a variety of microscopies, such as atomic force microscopy, to sense the chemical or biological features of a sample by, for example, creating a phase image by measuring force adhesions or performing force titrations by measuring adhesive and frictional forces. A detailed description and discussion of atomic force microscopy can be found Binnig et al., in *Phys. Rev. Lett.* 56, 930–933 (1986); by Hansma et al., in *Appl. Phys. Lett.* 64, 1738–1740 (1994); and by Bustamante et al., in *Curr. Op. Struct. Biol.* 7, 709–716 (1997).

Molecular probe 24 can have any chemical or biological property and can be used in microscopy to probe a sample. For example, a hydrophobic molecular probe, e.g., an alkyl group, can be used in microscopy to sense and locate hydrophobic areas of a sample. Alternatively, a biological molecular probe, e.g., a polypeptide, a ligand, a polynucleotide, or a polysaccharide, can be used in microscopy to sense and locate an active or binding site of an enzyme.

The invention will be further described in the following examples, which do not limit the scope of the invention described in the claims.

Making Carbon-based Nanotube Tips

Multi-walled nanotubes (MWNTs) and single-walled nanotubes (SWNTs) can be prepared by arc discharge, as described by Colbert et al. *Science*, 266, 1218, (1994), and by laser vaporization, as described by Thess et al. *Science*, 273, 483, (1996). Typically, the MWNTs are produced either as single MWNTs or as bundles of MWNTs. SWNTs, typically, are produced as ropes of SWNTs where each strand of the rope includes a SWNT.

Sharpened, unmodified nanotube tips are carboxy-terminated. Thus, in one aspect, the modification of carbon-based nanotube tips is based on the presence of carboxyl (—COOH) functional groups at open carbon nanotube tip ends. Carbon-based nanotubes are functionalized via an oxidation process to include carboxyl groups at the tip end. For example, MWNT samples prepared via arc discharge are purified by oxidizing the carbon-based nanotubes at 700° C. in the presence of air until approximately 2% of the original mass remained. SWNT samples can be prepared via arc discharge, pulsed laser vaporization, or chemical vapor deposition. The SWNT samples can be purified by sonication and filtration through 0.8 micron pore membranes. See for example, Bonard et al. *Adv. Mat.*,9, 827 (1997), K. Tohji et al. *J. Phys. Chem. B*, 101, 1974 (1997), and K. Tohji et al., *Nature*, 383, 679, (1996).

The modified carbon-based nanotubes, i.e., those including carboxyl groups at the tip end, were attached to the pyramids of Au-coated Si cantilevers (k=0.5–5 N/m) from Digital Instruments, Inc., Part type FESP, while under the direct view of an optical microscope using dark-field illumination. The nanotubes can be attached to the cantilever by (i) first coating the terminal 1–2 micron sections of a Si tip with an acrylic adhesive, e.g., a conductive carbon adhesive from Electron Microscopy Services, inc.; (ii) then brushing the Si tip with adhesive against an observable bundle of MWNTs or rope of SWNTs; and (iii) finally pulling the bundle or rope free from its connections with other nanotubes.

Once attached to the cantilever, the carbon-based nanotubes are shortened to a length between about 1 nm and 30 microns by applying, in an oxygen environment, a bias of about 1 to 50 Volts between the functionalized tip and a conductive surface, for example, a metal surface of sputtered Nb. The metal surface is, typically, placed about 10 to 50 nm away from the tip. Without being bound to any particular theory, it is believed that the applied voltage creates a momentary nanoscale arc that shortens the carbon-based nanotube.

Transmission electron microscopy images of the MWNT tips, prepared as described above, show that the oxidation process produces carbon-based nanotubes having open tip ends.

Additionally, other modifications of the carbon-based nanotubes can be made, such as those described by Rongqing et al. in *Chem. Mater.*, 10, 718, (1998); and by Shik et al. in *Angew. Chem. Int. Ed. Engl.*, 36, 2198, (1997). In some instances, it may be possible to modify carbon-based nanotubes using fullerene chemistry, such as those described by Prato in *J. Mater. Chem.*, 7, 1097, (1997); and by Fagan et al. in *Carbon*, 30, 1213, (1992).

Chemical Functionalization of Carbon-based Nanotubes

The modified carbon-based nanotubes described above, i.e., those including carboxyl groups, can be readily functionalized by using a variety of reactions, such as those described by March, J. in *Advanced Organic Chemistry* (John Wiley and Sons, Inc., 1992).

One type of chemical modification includes selectively coupling amines to the terminal carboxyl groups to form amide-linked groups, see for example, Bodanszky's, *The Practice of Peptide Synthesis*, 2nd ed. (Springer-Verlag, New York, 1994), and Giles et al., *Anal. Biochem*. 184, 244 (1990). The broad applicability of this coupling reaction to aqueous and nonaqueous chemistry makes it especially attractive for nanotube functionalization.

General Procedure for Nanotube Tip Functionalization

A cantilever-carbon-based nanotube assembly, as described above, is placed, for two hours, in a solution of 50 mM 1-ethyl-3-(3-dimethylaminopropyl carbodiimide hydrochloride) and 5 mM of the functionalizing molecule, e.g., benzylamine, ethylenediamine, or 5-(biotinamido) pentylamine, in 0.1 M 2-(N-morpholino)ethanesulfonic acid (MES) buffer having a pH of 6.0. The tip is rinsed and washed (i) in a solution of 0.1 MES buffer having a pH of 6.0, (ii) 0.1 M NaCl, and (iii) in deionized water.

Assessing Functionality of Carbon-based Nanotubes

An approach for assessing the functionality at a specific carbon-based nanotube tip end is to measure the adhesion force between the tip and a surface that terminates in a known chemical functionality (i.e., chemical force microscopy). Adhesion measurements carried out as a function of solution pH (force titrations) show the fraction of proton dissociation from the surface carboxyl groups can be readily monitored by the drop in adhesion force as in a classic pH titration. See, for example, Frisbie et al. *Science*, 2G5, 2071, (1994); Noy et al. *Annu. Rev. Mater. Sci.*, 27, 381, (1997); McKendry et al. *Nature* 391, 566, (1998); and Vezenov et al. *J. Am. Chem. Soc.* 119, 2006, (1997). The adhesion measurements were recorded on a Digital Instruments, Nanoscope III Multimode AFM.

Figure 2:
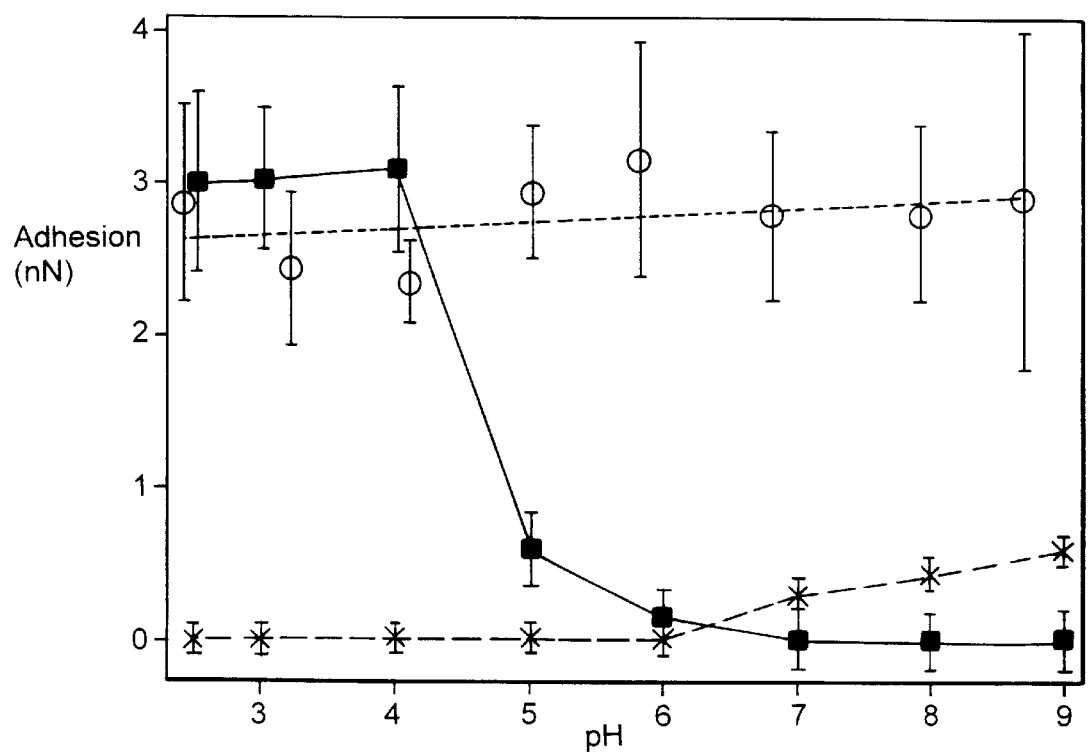
FIG. 2 is a plot showing the adhesion force as a function of pH between a hydroxyl-terminated surface and three separate carbon nanotubes probes having different terminal groups.

FIG. 2 shows a plot of force titrations between pH 2 and 9. The titrations were performed on hydroxyl-terminated self-assembled monolayers substrates (11-thioundecanol on gold-coated mica) with each functionalized MWNT tip. The functionalized groups on the MWNT tips are carboxyl, benzyl, and ethylamino.

In these and all other experiments described below, the applied loads were kept below the force required for nanotube buckling to ensure that only the nanotube end contacted the surface. The MWNT having a carboxylic acid at the tip end (squares) exhibits a well-defined drop in the adhesion force at ca. pH 4.5 that is characteristic of the deprotonation of a carboxylic acid.

The observed decrease in adhesion force with increasing pH is also reversible for a given tip and the transition is observed reproducibly for other tips. The absolute value of the adhesion force at low pH can vary between tips. It is possible that this reflects a variation in the number of carboxyl groups exposed at the ends of different tips. Each data point corresponds to the mean of 50–100 adhesion measurements, and the error bars represent one standard deviation. Lastly, the similarity of the value of the pKa determined in these force titrations to the bulk solution value for benzoic acid implies that the carboxyl group is well-solvated and accessible to reaction.

MWNT tips modified with benzylamine (circles), which should expose nonionizable, hydrophobic functional groups at the tip end, yield the expected pH-independent interaction force on hydroxyl-terminated SAM substrates. This covalent modification thus eliminates the prominent pH-dependent behavior observed with the tips functionalized with carboxyl groups. Moreover, force titrations with ethylenediamine functionalized MWNT tips (crosses) exhibit no adhesion at low pH and finite adhesion above pH 7. These pH-dependent interactions are consistent with the chemical expectations for an exposed basic amine functionality that is protonated and charged at low pH and neutral at high pH.

Additional experiments carried out on independent tips modified using benzylamine and ethylenediamine confirm the reproducibility of these results. These examples, thus, demonstrate unambiguously that carboxyl groups are exposed at the ends of nanotube tips and that these groups can be modified to produce probes with very distinct chemical functionalities.

Functionalized Carbon-based Nanotubes for Chemical Sensing and Imaging

The use of functionalized MWNT for chemically-sensitive imaging has been investigated using patterned self-assembled monolayer substrates. Specifically, intermittent contact or tapping mode images were recorded in ethanol solution with carboxyl-terminated MWNT tips on substrates patterned with squares that terminate in $CH_3$ groups and surrounded by COOH—terminated regions. The patterned sample was prepared by microcontact printing and consisted of 10 µm squares of a methyl-terminated (hexadecanethiol) self-assembled monolayer region surrounded by a carboxylic acid-terminated (16-mercaptohexadecanoic acid) self-assembled monolayer background on gold. Tapping mode images recorded with a carboxyl terminated MWNT exhibit a difference in phase between the two sample areas, although there is no difference in height: the tip-COOH/sample-COOH regions exhibit a phase lag relative to the tip-COOH/sample-$CH_3$ regions. Phase lag differences can be quantitatively related to differences in the adhesion forces, and thus can be interpreted in terms of a map of the chemical functionality. See for example, Noy et al., *Langmuir*, 14, 1508, (1998). By using this technique, an image of the patterned sample can be created. The contrast in the image would correspond to phase variations between the different chemical regions of the sample. Images and force curves were acquired with a Nanoscope III (Digital Instruments, Inc.). Imaging parameters were optimized for individual tips; typical ranges for the FESP nanotube tips were (i) resonant frequencies, 28–33 kHz; (ii) free RMS oscillation amplitude, 30–90 nm, (iii) setpoint, 1–3 V, and (iv) scan rate, 0.5–1.2 Hz.

The recorded adhesion force between the carboxyl-terminated nanotube tip and the COOH-terminated SAM is greater than the $CH_3$-terminated region. The greater adhesion is due to the hydrophilic-hydrophilic interaction of the MWNT functionalized tip and SAM. The hydrophilic-hydrophobic interaction of the MWNT functionalized tip and the self-assembled monolayer has a smaller adhesion. These results are consistent with chemically sensitive imaging.

Furthermore, when tips are covalently modified with benzylamine, which produces a hydrophobic tip that interacts more strongly with the $CH_3$ vs. COOH regions of the sample, the phase contrast is reversed, as expected based on the change in intermolecular interactions.

In addition, control experiments carried out using the same modification procedures but without the coupling reagent required for covalent bond formation exhibit the same phase contrast as the starting tips. These imaging results demonstrate that direct coupling reactions on nanotube tips can be used to create chemically-sensitive imaging probes.

Biological Functionalized Carbon-based Nanotubes

Functionalized MWNT tips also offer the possibility of probing biological systems at the nanometer scale. To illustrate this point, MWNT tips were functionalized to probe the well-characterized ligand-receptor interaction of biotin-streptavidin.

A MWNT tip was functionalized with 5-(biotinamido) pentylamine, e.g., obtained from Pierce Chemical Co., via the formation of an amide bond. Force-displacement measurements were made on mica surfaces containing immobilized streptavidin. The streptavidin protein surface was formed by coating a cleaved mica substrate with 250 µg/ml biotinamidocaproyl-labeled bovine serum albumin (Sigma) in phosphate buffer saline pH 5.6 for 2 hours, rinsing in pH 7.0 phosphate buffer saline, and then incubating with 30 µg/ml streptavidin (Sigma) in pH 7.0 phosphate buffer saline for two hours.

Figure 3:
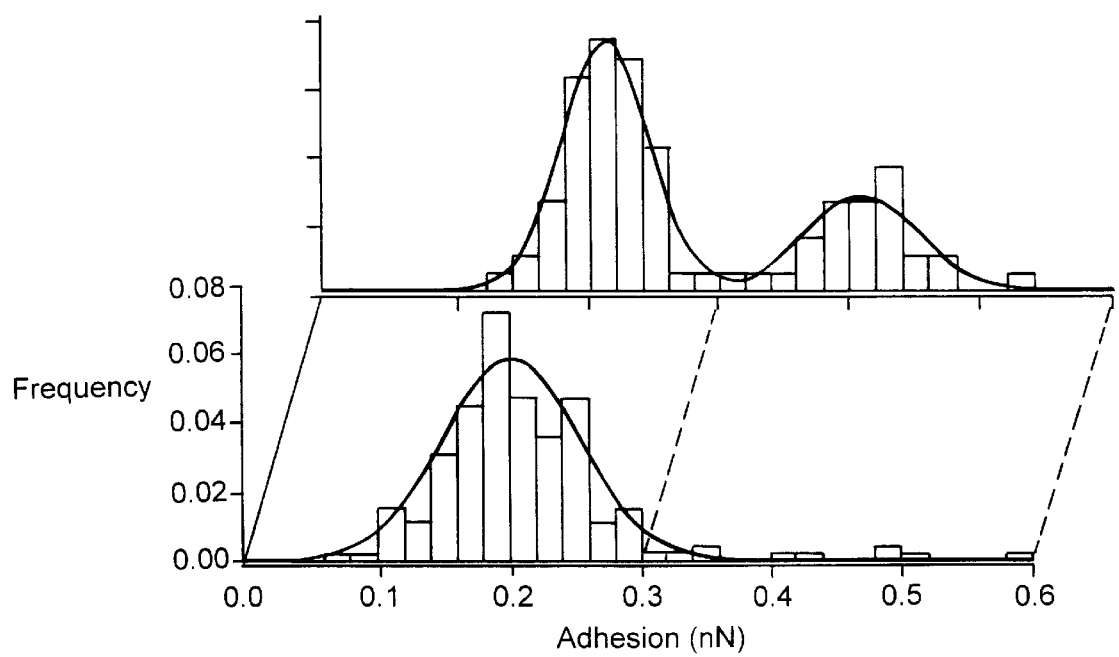
FIG. 3 shows adhesion histograms obtained from adhesion experiments between streptavidin surfaces and two separate carbon nanotube probes having terminal biotinyl groups.

As shown in FIG. 3, adhesion histograms were recorded with a biotin modified nanotube tip on the streptavidin surface in pH 7.0 from two separate biotinylated nanotube tips on streptavidin-derivatized surfaces. One tip showed a single peak centered at 200 pN that corresponds to the unbinding of a single biotin-streptavidin ligand-receptor complex. The other tip exhibited a bimodal distribution peaking at 200 and 400 pN that corresponds to the unbinding of one and two biotin-streptavidin ligand-receptor complexes, respectively. The first tip showed single binding events in 36% of the measurements, while no binding was detected in the remaining 64% of the curves. The second tip showed single and double binding events in 30 and 15% of the measurements, respectively. No interaction was detected in the remaining 55% of the data.

The measurements show well-defined binding force quanta of ca. 200 pN per biotin-streptavidin pair. Control experiments carried out with an excess of free biotin in solution, which blocks all receptor sites of the protein, and with unmodified nanotube tips showed no adhesion, and thus confirm that the observed binding force results from the interaction of nanotube-linked biotin with surface streptavidin. The functionalized nanotube tips usually exhibit only single binding events of 200 pN, although with some tips it is also possible to observe events of 2x this force which is attributed to simultaneously unbinding two biotin-streptavidin pairs. The measured binding force quanta agree with previous atomic force microscopy studies in which biotin or avidin were attached to probe tips via nonspecific adsorption of bovine serum albumin.

The above examples demonstrate that organic synthesis can be applied to the specific functionalization of nanotube tips thus creating molecular probes.

Additional biological functionalized carbon-based nanotubes include, for example, carbon-based nanotubes functionalized with polypeptides, actin, myosin, nucleic acids, nucleosides, nucleotides, bacteria, viruses, organelles, chromosomes, pharmaceutical compounds, polysaccharides, lipids, enzymes, substrates, antigens, and antibodies.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

This same approach can be used to attach individual ligands, proteins or other macromolecules in a spatially-defined manner to the ends of nanotubes, and then use these functionalized probes to create high-resolution maps of binding domains on, for example, proteins and membranes.

In addition to the uses described above, modified carbon-based nanotube tips are also useful for imaging self-assembled, polymeric and biological materials. In particular, single-walled nanotubes can be used to map functional groups with molecular resolution, i.e., lateral resolution of less than 4 nm. One can also link catalysts, such as transition metal complexes, to carbon-based nanotube ends, thus creating tools that can modify or create structures at the molecular scale in regions where the molecular probe is near the sample. Examples of catalysts include, but are not limited to, Vaska's complex used for oxidative addition, hydrogenation catalysts, i.e., Wilkinson's catalyst [RhCl(P(C$_6$H$_5$)$_3$)$_3$)], hydroformylation catalysts, hydrosilylation catalysts, epoxidation catalysts, such as Jacobsen's catalyst, as well as hydrolytic (proteolytic/nucleolytic) catalysts used for localized hydrolysis.

Furthermore, the functionalized nanotube ends can serve as the basis for creating specific nanometer scale interconnects for electronic devices and assembling new classes of materials from nanotubes.

What is claimed is:

1. A carbon-based tip for scanning probe microscopy, the tip, used to reveal chemical characteristics of a sample, comprising a structure of the formula:

$$X-(L-M)_n$$

in which n is 1 to 100, X is a carbon-based nanotube having a first end and a second end, L is a linking group bonded at the first end of the carbon-based nanotube, and M is a molecular probe bonded to the linking group, the second end of the carbon-based nanotube being adapted for attachment to a cantilever configured for microscopy.

2. The carbon-based tip of claim 1, wherein L is a functional moiety including an amino, amido, carbonyl, carboxyl, alkyl, aryl, ether, or ester group.

3. The carbon-based tip of claim 2, wherein L is a functional moiety including an amino group.

4. The carbon-based tip of claim 2, wherein L is a functional moiety including an amido group.

5. The carbon-based tip of claim 1, wherein M is selected from the group consisting of hydrogen hydroxy, amino, C$_{1-20}$ alkyl, C$_{2-20}$ alkenyl, C$_{2-20}$ alkynyl, C$_{1-20}$ heteroalkyl, C$_{2-20}$ heteroalkenyl, C$_{3-8}$ cycloalkyl, C$_{3-8}$ cycloalkenyl, C$_{4-8}$ aryl, C$_{2-30}$ heterocycle, a polypeptide, a polysaccharide, a lipid, and a polynucleotide.

6. The carbon-based tip of claim 2, wherein M is selected from the group consisting of hydrogen, hydroxy, amino, C$_{1-20}$ alkyl, C$_{2-20}$ alkenyl, C$_{2-20}$ alkynyl, C$_{1-20}$ heteroalkyl, C$_{2-20}$ heteroalkenyl, C$_{3-8}$ cycloalkyl, C$_{3-8}$ cycloalkenyl, C$_{4-8}$ aryl, C$_{2-30}$ heterocycle, a polypeptide, a polysaccharide, a lipid, and a polynucleotide.

7. The carbon-based tip of claim 3, wherein M is selected from the group consisting of hydrogen, hydroxy, amino, C$_{1-20}$ alkyl, C$_{2-20}$ alkenyl, C$_{2-20}$ alkynyl, C$_{1-20}$ heteroalkyl, C$_{2-20}$ heteroalkenyl, C$_{3-8}$ cycloalkyl, C$_{3-8}$ cycloalkenyl, C$_{4-8}$ aryl, C$_{2-30}$ heterocycle, a polypeptide, a polysaccharide, a lipid, and a polynucleotide.

8. The carbon-based tip of claim 4, wherein M is selected from the group consisting of hydrogen, hydroxy, amino, C$_{1-20}$ alkyl, C$_{2-20}$ alkenyl, C$_{2-20}$ alkynyl, C$_{1-20}$ heteroalkyl, C$_{2-20}$ heteroalkenyl, C$_{3-8}$ cycloalkyl, C$_{3-8}$ cycloalkenyl, C$_{4-3}$ aryl, C$_{2-30}$ heterocycle, a polypeptide, a polysaccharide, a lipid, and a polynucleotide.

9. A carbon-based tip of claim 1, wherein L includes a functional group selected from the group consisting of carboxyl, carbonyl, amino, amido, alkyl, aryl, ether, and ester.

10. The carbon-based tip of claim 9, wherein L includes an amino.

11. The carbon-based tip of claim 10, wherein L includes an amido.

12. The carbon-based tip of claim 9, wherein M is selected from the group consisting of hydrogen, hydroxy, amino, C$_{1-20}$ alkyl, C$_{2-20}$ alkenyl, C$_{2-20}$ alkynyl, C$_{1-20}$ heteroalkyl, C$_{2-20}$ heteroalkenyl, C$_{3-8}$ cycloalkyl, C$_{3-8}$ cycloalkenyl, C$_{4-8}$ aryl, C$_{2-30}$ heterocycle, a polypeptide, a polysaccharide, a lipid, and a polynucleotide.

13. The carbon-based tip of claim 10, wherein M is selected from the group consisting of hydrogen, hydroxy, amino, C$_{1-20}$ alkyl, C$_{2-20}$ alkenyl, C$_{2-20}$ alkynyl, C$_{1-20}$ heteroalkyl, C$_{2-20}$ heteroalkenyl, C$_{3-8}$ cycloalkyl, C$_{3-8}$ cycloalkenyl, C$_{4-8}$ aryl, C$_{2-30}$ heterocycle, a polypeptide, a polysaccharide, a lipid, and a polynucleotide.

14. The carbon-based tip of claim 11, wherein M is selected from the group consisting of hydrogen, hydroxy, amino, C$_{1-20}$ alkyl, C$_{2-20}$ alkenyl, C$_{2-20}$ alkynyl, C$_{1-20}$ heteroalkyl, C$_{2-20}$ heteroalkenyl, C$_{3-8}$ cycloalkyl, C$_{3-8}$ cycloalkenyl, C$_{4-8}$ aryl, C$_{2-30}$ heterocycle, a polypeptide, a polysaccharide, a lipid, and a polynucleotide.

15. A method of probing a sample by scanning probe microscopy, the method comprising:

providing a carbon-based nanotube having a molecular probe linked to one end of the carbon-based nanotube; and sensing the surface of the sample with the molecular probe to reveal the chemical characteristics of the sample.

16. The method of claim 15, wherein the molecular probe is linked to one end of the carbon-based nanotube by a functional moiety selected from the group consisting of amino, amido, carbonyl, carboxyl, alkyl, aryl, ether, and ester.

17. The method of claim 15, wherein the molecular probe is linked through an amino to the end of the carbon-based nanotube.

18. The method of claim 17, wherein the molecular probe is linked through an amido to the end of the carbon-based nanotube.

19. The method of claim 15, wherein the molecular probe is selected from the group consisting of hydrogen, hydroxy, amino, C$_{1-20}$ alkyl, C$_{2-20}$ alkenyl, C$_{2-20}$ alkynyl, C$_{1-20}$ heteroalkyl, C$_{2-20}$ heteroalkenyl, C$_{3-8}$ cycloalkyl, C$_{3-8}$ cycloalkenyl, C$_{4-8}$ aryl, C$_{2-30}$ heterocycle, a polypeptide, a polysaccharide, a lipid, and a polynucleotide.

20. The method of claim 16, wherein the molecular probe is selected from the group consisting of hydrogen, hydroxy, amino, C$_{1-20}$ alkyl, C$_{2-20}$ alkenyl, C$_{2-20}$ alkynyl, C$_{1-20}$ heteroalkyl, C$_{2-20}$ heteroalkenyl, C$_{3-8}$ cycloalkyl, C$_{3-8}$ cycloalkenyl, C$_{4-8}$ aryl, C$_{2-30}$ heterocycle, a polypeptide, a polysaccharide, a lipid, and a polynucleotide.

21. The method of claim 17, wherein the molecular probe is selected from the group consisting of hydrogen, hydroxy, amino, C$_{1-20}$ alkyl, C$_{2-20}$ alkenyl, C$_{2-20}$ alkynyl, C$_{1-20}$ heteroalkyl, C$_{2-20}$ heteroalkenyl, C$_{3-8}$ cycloalkyl, C$_{3-8}$ cycloalkenyl, C$_{4-8}$ aryl, C$_{2-30}$ heterocycle, a polypeptide, a polysaccharide, a lipid, and a polynucleotide.

22. The method of claim 18, wherein the molecular probe is selected from the group consisting of hydrogen, hydroxy, amino, C$_{1-20}$ alkyl, C$_{2-20}$ alkenyl, C$_{2-20}$ alkynyl, C$_{1-20}$ heteroalkyl, $C_{2-20}$ heteroalkenyl, $C_{3-8}$ cycloalkyl, $C_{3-8}$ cycloalkenyl, $C_{4-8}$ aryl, $C_{2-30}$ heterocycle, a polypeptide, a polysaccharide, a lipid, and a polynucleotide.

23. A method of removing a molecular probe from a carbon-based tip for use in scanning probe microscopy, the method comprising:

providing a carbon-based tip which includes a carbon-based nanotube and a molecular probe linked to one end of the carbon-based nanotube;

providing a metal surface near the first molecular probe; and applying a voltage between the carbon-based nanotube and the metal surface to remove the molecular probe.

24. The method of claim 23, wherein the voltage is between 1 volt and 50 volts.

* * * * *